C. S. TEGNANDER,
WAGON-WHEELS.

No. 194,272. Patented Aug. 14, 1877.

WITNESSES.
Sam'l Delpeaux
Geo. H. Carl

INVENTOR.
C. S. Tegnander
Per Bjorn Bros,
Attorneys.

UNITED STATES PATENT OFFICE.

CONRAD S. TEGNANDER, OF GOTTENBURG, SWEDEN, ASSIGNOR OF ONE-THIRD OF HIS RIGHT TO ANDREW L. JOHNSON, OF BOSTON, MASS.

IMPROVEMENT IN WAGON-WHEELS.

Specification forming part of Letters Patent No. 194,272, dated August 14, 1877; application filed July 6, 1877.

*To all whom it may concern:*

Be it known that I, CONRAD S. TEGNANDER, of Gottenburg, in the Province of Gottenburg and Kingdom of Sweden, have invented a certain new and useful Improvement in Wagon-Wheels, of which the following is a specification:

This improved wheel is made of iron, steel, brass, or other suitable metal, and in its construction embraces the usual four elements of a wheel, to wit: a hub or nave, spokes, felly, and tire, each and all of which are respectively constructed and applied together substantially as hereinafter described, making a wheel which is light yet strong and durable, and reasonable in price, all of which will fully appear from the description hereinafter given of the same, reference being had to the accompanying plate of drawings, in which—

Figure 1:
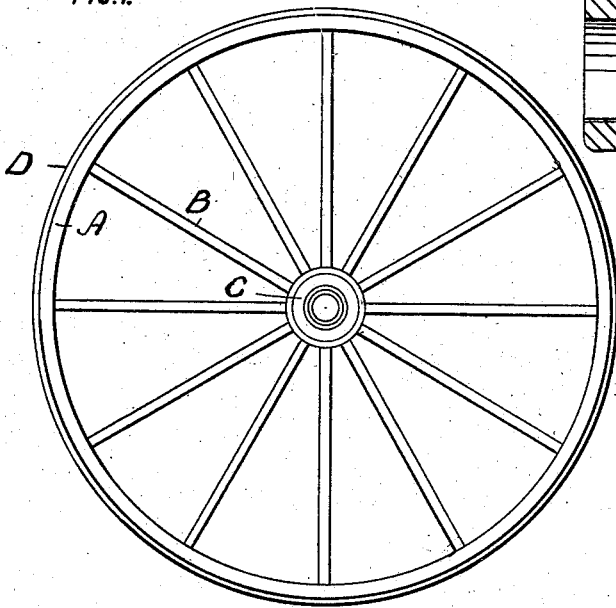
Figure 3:
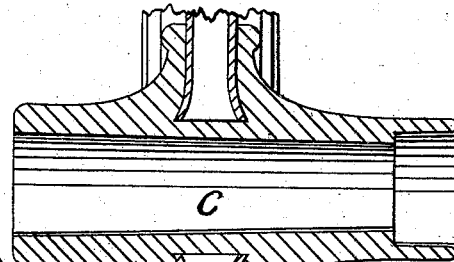
Figure 2:
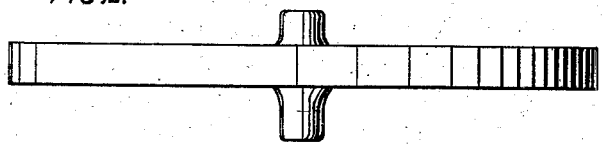

Figure 1 is a side elevation; Fig. 2, a plan view; Fig. 3, a vertical central section; Figs. 4, 5, 6, and 7, views in detail, to be hereinafter referred to.

In the drawings, A represents the felly; B, the spoke; C, the hub, and D the tire, each and all made of metal, such as iron, steel, brass, or other suitable metal, applied together in the manner as follows, to wit:

The felly A is a metal band of gutter shape, bent into the circular size of the wheel, and its two ends welded together with the convex side of the gutter-shaped band toward the inside.

The spokes B, of proper length, are then inserted through holes of the felly, at proper and regular distances apart, and within the concavity of the felly, clinched and riveted, as shown in Fig. 3. These spokes may be hollow or solid.

The wheel thus in part produced is then placed in a mold of suitable shape and construction, and a solid hub or nave cast upon and about the inner ends of the spokes.

The tire D is cut out of a suitable band of metal of the required length, its two ends welded together in any suitable manner, and when heated to a red heat is then applied to the outer periphery of the felly and then clinched against the sides thereof. The hub is then bored out for the reception of the axle, completing the wheel.

The nave or hub may be molded in any ornamental style desired, as is obvious.

Figure 4:
Figure 5:
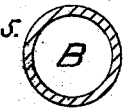
Figure 6:
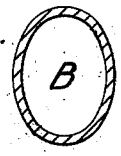
Figure 7:
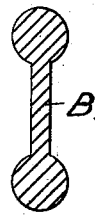

Fig. 5 is a view in cross-section of the spoke shown in Figs. 1 and 3; Figs. 4 and 7 views, in cross-section, of solid spokes of different form; and Fig. 6, view, in cross-section, of a spoke of elliptical form, instead of round, as shown in Fig. 5.

Having thus described my invention, what I claim, and desire to secure by Letters Patent, is—

A vehicle-wheel composed wholly of metal, and having the spokes B inserted through openings in the concave felly A, and clinched in place at their outer ends, the hub C, cast upon the inner ends of the spokes, and the tire D applied to the felly, the whole being combined substantially as and for the purpose described.

CONRAD SAMUEL TEGNANDER. [L. S.]

Witnesses:
    MAGNUS DAHLGREN,
    CARL ÖRNSKÖLD.